United States Patent
Sarby

(10) Patent No.: US 8,562,925 B2
(45) Date of Patent: Oct. 22, 2013

(54) ARRANGEMENT AND METHOD FOR CONTROLLING THE QUANTITY OF A REDUCTANT INTRODUCED INTO AN EXHAUST LINE OF AN INTERNAL COMBUSTION ENGINE

(75) Inventor: Håkan Sarby, Huddinge (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 13/811,704

(22) PCT Filed: Jul. 11, 2011

(86) PCT No.: PCT/SE2011/050938
§ 371 (c)(1),
(2), (4) Date: Jan. 23, 2013

(87) PCT Pub. No.: WO2012/021103
PCT Pub. Date: Feb. 16, 2012

(65) Prior Publication Data
US 2013/0121901 A1 May 16, 2013

(30) Foreign Application Priority Data
Aug. 13, 2010 (SE) ...................................... 1050853

(51) Int. Cl.
*B01D 53/56* (2006.01)
*B01D 53/58* (2006.01)
*B01D 53/94* (2006.01)
*F01N 3/10* (2006.01)
*F01N 3/18* (2006.01)
*G05B 21/00* (2006.01)

(52) U.S. Cl.
USPC ..................... 423/213.2; 423/213.7; 422/105; 422/108; 422/111; 60/274; 60/276; 60/277; 60/299; 60/301; 700/266; 700/271

(58) Field of Classification Search
USPC ............ 423/213.2, 213.7; 422/105, 108, 111; 60/274, 276, 277, 299, 301; 700/266, 700/271
See application file for complete search history.

(56) References Cited

U.S. PATENT DOCUMENTS 8,387,368 B2 * 3/2013 Parmentier et al. ............. 60/286
2009/0104096 A1 * 4/2009 Patchett et al. ............ 423/213.5

(Continued)

FOREIGN PATENT DOCUMENTS

EP 2 143 901 A1 1/2010
WO WO 2010/053168 A1 5/2010

OTHER PUBLICATIONS

International Search Report dated Nov. 17, 2011 issued in corresponding International Patent Application No. PCT/SE2011/050938.

*Primary Examiner* — Timothy Vanoy
(74) *Attorney, Agent, or Firm* — Ostrolenk Faber LLP

(57) ABSTRACT

An arrangement for controlling injection of a reducing agent in an exhaust line of a combustion engine (1): An injection system (8-12) injects the reducing agent into the exhaust line (3). A first catalyst (13) reduces the amount of nitrogen oxides in the exhaust gases in the exhaust line (3) using the reducing agent. A second catalyst (14) downstream of the first catalyst (13) in the exhaust line (3) converts ammonia in the exhaust gases to nitrogen gas and nitrous oxide. A nitrous oxide sensor (17) monitors the amount of nitrous oxide in the exhaust line (3) downstream of the second catalyst (14). A control unit (10) of the injection system (8-12) adjusts the amount (q) of reducing agent injected into the exhaust line (3) if the sensor (17) detects that the amount of nitrous oxide is not within a selected range (A).

21 Claims, 2 Drawing Sheets

(56) References Cited

U.S. PATENT DOCUMENTS

| | | |
|---|---|---|
| 2010/0024393 A1 | 2/2010 | Chi et al. |
| 2010/0223914 A1 | 9/2010 | Döring et al. |
| 2010/0281853 A1* | 11/2010 | Toshioka et al. ............... 60/276 |
| 2012/0311996 A1* | 12/2012 | Balenovic et al. ............. 60/274 |

* cited by examiner

ARRANGEMENT AND METHOD FOR CONTROLLING THE QUANTITY OF A REDUCTANT INTRODUCED INTO AN EXHAUST LINE OF AN INTERNAL COMBUSTION ENGINE

CROSS-REFERENCE TO RELATED APPLICATIONS

The present application is a 35 U.S.C. §§371 national phase conversion of PCT/SE2011/050938, filed Jul. 11, 2011, which claims priority of Swedish Application No. 1050853-9, filed Aug. 13, 2010, the contents of which are incorporated by reference herein. The PCT International Application was published in the English language.

BACKGROUND TO THE INVENTION AND PRIOR ART

The invention relates to an arrangement and a method for controlling the amount of a reducing agent which is supplied to an exhaust line of a combustion engine.

One way of reducing emissions of nitrogen oxides from diesel engines is to use a technique called SCR (selective catalytic reduction). This involves a reducing agent in the form of a urea solution being supplied in a specific dose to the exhaust gases in the exhaust line of a diesel engine. When urea solution is sprayed into the exhaust line, the resulting finely divided solution becomes vaporised by contact with the hot exhaust gases, and ammonia is formed. The mixture of ammonia and exhaust gases is then led through an SCR catalyst in which the nitrogen in the nitrogen oxides in the exhaust gases reacts with the nitrogen in the ammonia to form nitrogen gas. The oxygen in the nitrogen oxides reacts with the hydrogen in the ammonia to form water. The nitrogen oxides in the exhaust gases are thus reduced in the catalyst to nitrogen gas and water vapour. With correct dosage of urea, the diesel engine's emissions of nitrogen oxides may be greatly reduced.

The dosage of the urea solution is usually based on measurements of the amount of nitrogen oxides NO before the SCR catalyst, but the measuring accuracy of a nitrogen oxide sensor is not particularly good. A nitrogen oxide content value measured by a nitrogen oxide sensor may differ from the actual value by about 10%. Moreover, the measuring accuracy of nitrogen oxide sensors worsens with age.

In particular, when too large amounts of urea solution are added, ammonia passes through the SCR catalyst without reacting with nitrogen oxides in the exhaust gases. To eliminate this ammonia, an ammonia catalyst is usually provided downstream of the SCR catalyst. The function of the ammonia catalyst is to convert ammonia to nitrogen gas. A problem with ammonia catalysts is that in addition to nitrogen gas they also form nitrous oxide ($N_2O$). Nitrous oxide is a greenhouse gas about 300 times stronger than carbon dioxide. It is therefore very important for discharges of nitrous oxide to be reduced. Too high dosage of urea solution also increases the risk that urea lumps might form in the exhaust line.

SUMMARY OF THE INVENTION

The object of the present invention is to propose an arrangement and a method whereby the reducing agent is added in an amount such that discharges of nitrogen oxides and nitrous oxide are reduced in a substantially optimum way.

This object is achieved with an arrangement of the kind mentioned in the invention. The first catalyst may be an SCR catalyst which reduces the amount of nitrogen oxides in the exhaust gases in the exhaust line by means of the reducing agent supplied. The second catalyst may be an ammonia catalyst which converts any ammonia which has not reacted with nitrogen oxides in the SCR catalyst. The surplus ammonia is converted in the ammonia catalyst to nitrogen gas and nitrous oxide. The amount of nitrous oxide in the exhaust line downstream of the ammonia catalyst is related to the surplus of ammonia in the SCR catalyst and to the amount of reducing agent injected into the exhaust line. According to the invention, a nitrous oxide sensor is used to detect the amount of nitrous oxide in the exhaust line at a location downstream of the ammonia catalyst. Such a sensor provides the control unit with information about whether the amount of reducing agent injected is correct or not. When it is not correct, the control unit adjusts the amount of reducing agent injected into the exhaust line until said sensor detects that the amount of nitrous oxide is within a desired range. When the amount of nitrous oxide is within the desired range, the reducing agent is added in an amount at which discharges of nitrogen oxides and nitrous oxide are reduced in a substantially optimum way.

According to a preferred embodiment of the invention, the control unit may be adapted to controlling the injection system so that it reduces the amount of reducing agent injected into the exhaust line when the amount of nitrous oxide exceeds an upper limit value. It may be appropriate to define an upper limit value for the nitrous oxide which should not be exceeded. When the sensor detects that the amount of nitrous oxide exceeds the upper limit value, the control unit will find that too much reducing agent is being injected into the exhaust line. The control unit will therefore reduce the amount of reducing agent injected into the exhaust line. The control unit may be adapted to controlling the injection system so that it reduces the amount of reducing agent injected into the exhaust line by a factor which is related to how far the amount of nitrous oxide exceeds the upper limit. The nitrous oxide amount may therefore be relatively quickly reduced to a value within the desired range.

According to another preferred embodiment of the invention, the control unit is adapted to controlling the injection system so that it increases the amount of reducing agent injected into the exhaust line when the amount of nitrous oxide is below a lower limit value. If the reducing agent is supplied in a chemically exact dose relative to the amount of nitrogen oxides in the exhaust gases, not all of the ammonia molecules will come into contact with a nitrogen oxide molecule within the SCR catalyst. For this reason it is appropriate to add a smaller surplus of reducing agent in order to reduce the amount of nitrogen oxides in an optimum way. A smaller amount of nitrous oxide is thus acceptable. For this reason it may be appropriate to define a lower limit value below which the amount of nitrous oxide should not fall. If the nitrous oxide amount is too low, the reducing agent is presumably being added in too small an amount for the ammonia formed to be able to reduce the nitrogen oxides in the exhaust gases in an optimum way. The control unit may here be adapted to controlling the injection system so that it increases the amount of reducing agent injected into the exhaust line by a factor which is related to how far the amount of nitrous oxide is below the lower limit value. The nitrous oxide amount can thus be relatively quickly increased to a value within the desired range.

According to another preferred embodiment of the invention, the control unit is adapted to estimating the amount of reducing agent to be injected into the exhaust line on the basis of information from a sensor which monitors a parameter related to the amount of nitrogen oxide in the exhaust line at a location upstream of the first catalyst. Such a sensor results in an initial estimate of the amount of nitrogen oxides in the exhaust line and an estimate of how much reducing agent is to be injected into the exhaust line. However, the measuring accuracy of sensors which detect the amount of nitrogen oxides is usually not very good. After the initially estimated amount of reducing agent has been injected into the exhaust line, the control unit receives information about the amount of nitrous oxide in the exhaust line. If it is too high or too low, the control unit may adjust the amount of reducing agent injected into the exhaust line to a value within the desired range at which nitrogen oxides and nitrous oxide are reduced in an effective way. The control unit is with advantage also adapted to estimating the amount of reducing agent to be injected into the exhaust line on the basis of information about the exhaust flow in the exhaust line. The magnitude of the exhaust flow is also a factor which influences how much reducing agent is to be injected into the exhaust line. The exhaust flow may be estimated on information about the air flow to the combustion engine.

According to another preferred embodiment of the invention, the control unit is adapted to receiving information from a temperature sensor which monitors the temperature of the exhaust gases in the exhaust line in order to decide whether the reducing agent is to be injected into the exhaust line or not. For it to be possible for the urea solution to be vaporised by them, the exhaust gases have to be at least at a higher temperature than the vaporisation temperature of the reducing agent. There also needs to be enough temperature difference to enable all of the reducing agent to become vaporised and be mixed with the exhaust gases before they reach the SCR catalyst. The reducing agent is therefore only injected into the exhaust line at times when the exhaust gases are at a high enough temperature. The first catalyst and the second catalyst may be situated in a portion of the exhaust line situated downstream of a turbine which is adapted to extracting energy from the exhaust gases. Supercharged combustion engines are usually provided with a turbo unit which compresses the air which is led to the engine. Said catalysts are usually situated at a location downstream of the turbo unit's turbine. The reducing agent is also usually injected into the exhaust line at a location downstream of the turbine, although it is possible for it to be injected at a location upstream of the turbine.

The object indicated above is also achieved with the method of the invention.

BRIEF DESCRIPTION OF THE DRAWINGS

A preferred embodiment of the invention is described below by way of example with reference to the attached drawings, in which.

DETAILED DESCRIPTION OF A PREFERRED EMBODIMENT OF THE INVENTION

Figure 1:
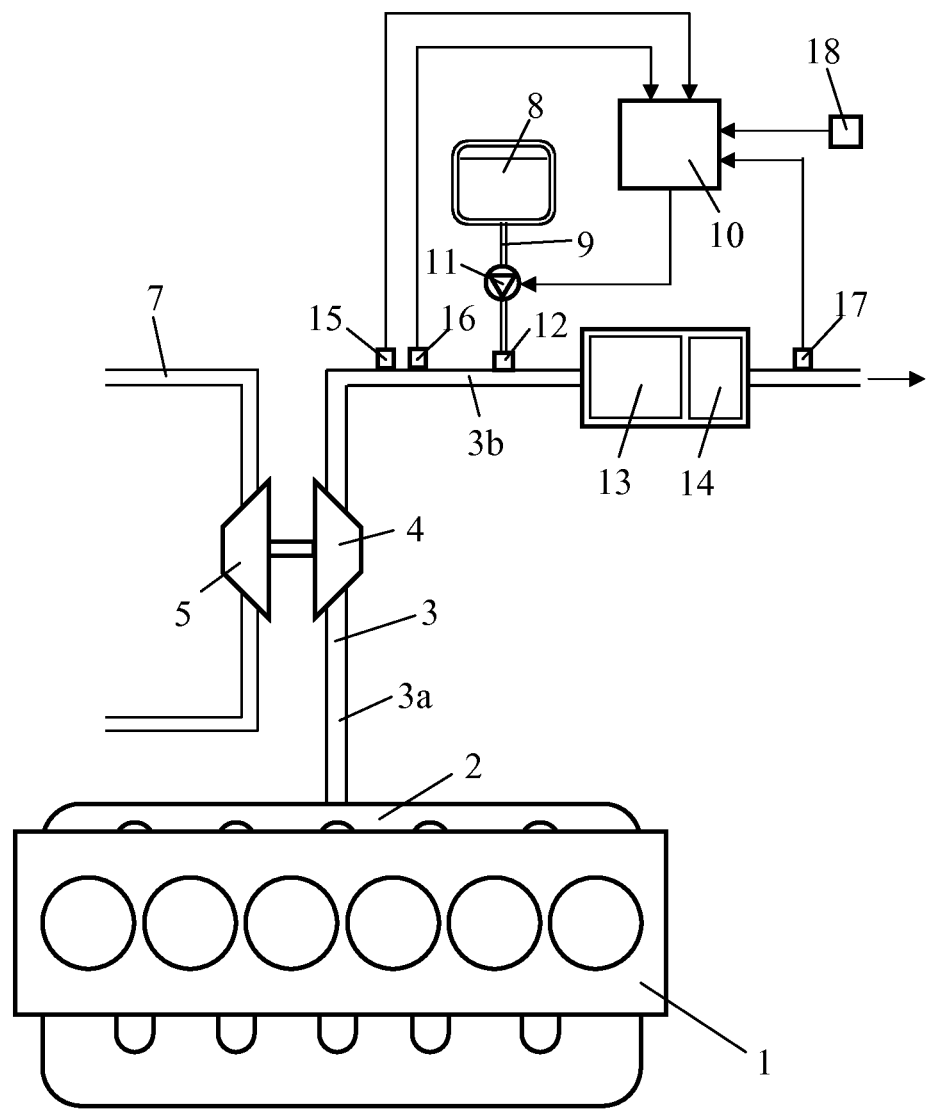
FIG. 1 depicts an arrangement according to an embodiment of the invention.

FIG. 1 depicts a supercharged combustion engine in the form of a diesel engine 1. The engine 1 may be intended to power a heavy vehicle. The exhaust gases from the cylinders of the engine 1 are led via an exhaust manifold 2 to an exhaust line 3. The exhaust line comprises a first section 3a extending to a turbine 4 of a turbo unit. The exhaust gases are at a relatively high pressure and a high temperature in the first section 3a. The turbine 4 is intended to convert the energy of the exhaust gases in the exhaust line 3 to mechanical work for driving a compressor 5 of the turbo unit. The exhaust line comprises a second section 3b situated after the turbine 4. The temperature and pressure of the exhaust gases in the second section 3b are considerably lower than in the first section 3a. The compressor 5 is intended to compress air which is drawn into an inlet line 7 and led to the respective cylinders of the engine 1.

The diesel engine 1 is provided with catalytic exhaust cleaning according to the method called SCR (selective catalytic reduction). This method involves an injection system injecting a reducing agent which may be a urea solution into the engine's exhaust line 3. The injection system comprises in this case a tank 8 for storage of urea solution, a line 9 extending between the tank 8 and the exhaust line 3, a pump 11 which conveys and pressurises the urea solution in the line 9, and an injection means 12. A control unit 10 is adapted to controlling the activation of the pump 11 so that the injection means 12 injects the urea solution into the exhaust line 3 in an amount which is calculated by the control unit 10. The injection means 12 is fitted in the second section 3b of the exhaust line. The urea solution supplied is intended to become vaporised and be converted to ammonia in the exhaust line 3 before it is led to an SCR catalyst 13 and an ammonia catalyst 14. The SCR catalyst 13 and the ammonia catalyst 14 may be situated in a shared container or in separate containers. An undepicted particle filter and an undepicted oxidation catalyst may also be situated in the exhaust line 3.

In the SCR catalyst 13, the ammonia reacts with the nitrogen oxides $NO_x$ in the exhaust line so that nitrogen gas and water vapour are formed. The nitrogen oxides comprise nitrogen monoxide NO and nitrogen dioxide $NO_2$. Any ammonia which does not react with the nitrogen oxides in the exhaust gases in the SCR catalyst 13 is converted in the ammonia catalyst 14 to nitrogen gas and nitrous oxide. A nitrogen oxide sensor 15 is adapted to detecting the nitrogen oxide amount in the exhaust gases at a location upstream of the SCR catalyst 13 in the second section 3b of the exhaust line 3. A temperature sensor 16 is adapted to measuring the temperature of the exhaust gases at a location upstream of the SCR catalyst 13 in the second section 3b of the exhaust line. A nitrous oxide sensor 17 is adapted to measuring the nitrous oxide amount at a location downstream of the ammonia catalyst 14 in the second section 3b of the exhaust line 3. A flow sensor 18 is adapted to providing the control unit 10 with information about the exhaust flow in the exhaust line. This may be done by the flow sensor measuring or in some other way estimating the air flow in the inlet line 7 to the engine 1. The control unit 10 is adapted to substantially continuously receiving information from the temperature sensor 16, the nitrogen oxide sensor 15, the nitrous oxide sensor 17 and the flow sensor 18.

Figure 2:
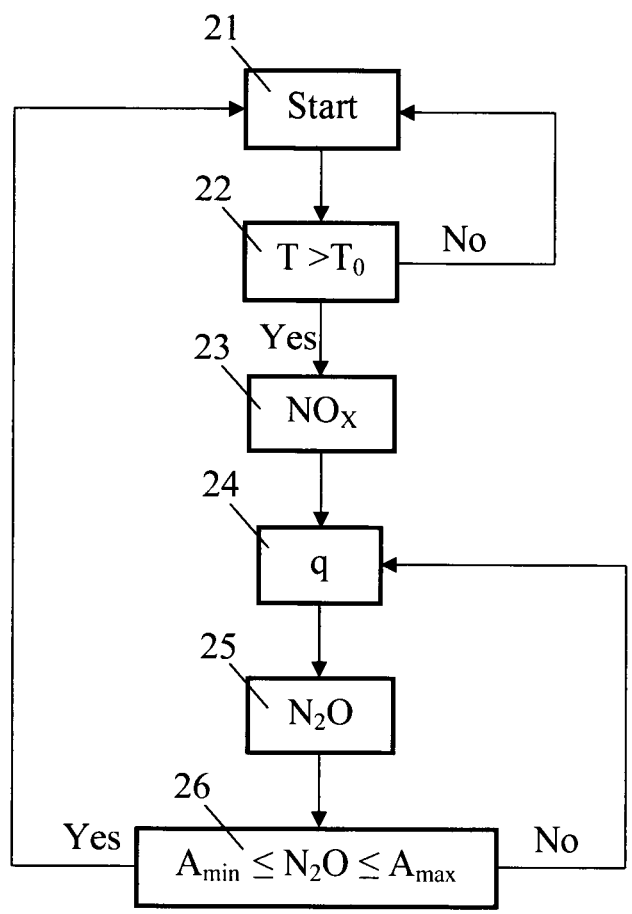
FIG. 2 is a flowchart illustrating a method according to the invention.

FIG. 2 is a flowchart illustrating a method for operating the arrangement in FIG. 1. The method starts at step 21. At step 22, the control unit 10 receives information from the temperature sensor 16 for deciding whether the exhaust gases are at a high enough temperature T to enable them to vaporise the urea solution at the prevailing pressure in the second section 3b of the exhaust line. If the temperature T of the exhaust gases is lower than the vaporisation temperature $T_0$ of the urea solution, the control unit 10 will find that the urea solution cannot be vaporised in the exhaust gases, in which case no urea solution will be injected into the exhaust line 3. The exhaust gases may be at a lower temperature than the requisite vaporisation temperature $T_0$ in situations where the vehicle has just started up or has been running at low load for a lengthy period. In that case, the method starts again at step 21.

When it receives information that the temperature T of the exhaust gases is higher than the vaporisation temperature $T_0$ of the urea solution, the control unit 10 will find that urea solution can be injected into the exhaust line 3. The control unit 10 thereupon receives, at step 23, information from the nitrogen oxide sensor 15 about the amount of nitrogen oxides $NO_x$ in the exhaust gases. The control unit 10 may at the same time receive information from the flow sensor 18 about the exhaust flow in the exhaust line 3. On the basis of this information, the control unit 10 estimates at step 24 the amount q of urea solution which needs to be supplied to the exhaust gases for the nitrogen oxides in them to be reduced in an optimum way.

The control unit 10 controls the pump 11 so that at step 24 the injection means 12 injects the calculated amount q of urea solution into the second section 3b of the exhaust line at a location upstream of the SCR catalyst 13. Since the exhaust gases will be at a higher temperature than its vaporisation temperature $T_0$, the urea solution will become vaporised relatively quickly after it has been injected into the second section 3b of the exhaust line. Vaporisation of the urea solution results in the formation of ammonia in gaseous form which mixes with the exhaust gases in the exhaust line. However, the measuring accuracy of a nitrogen oxide sensor 15 is not particularly good. It is therefore usual that in conventional applications the urea solution is often supplied in an overgenerous amount to ensure that enough ammonia is formed to enable the nitrogen oxides in the exhaust gases to be eliminated with certainty. The surplus ammonia is converted in the ammonia catalyst 14 to nitrogen gas and nitrous oxide. Nitrous oxide is a powerful greenhouse gas which has as far as possible to be prevented from being led out to the surroundings. Cases where the dosage of urea solution is too high also increase the risk that urea lumps might form in the exhaust line 3.

At step 25, the control unit 10 receives information from the nitrous oxide sensor 17 which measures the nitrous oxide amount in the exhaust gases downstream of the ammonia catalyst 14. The nitrous oxide amount is related to the amount of ammonia which is not utilised in the SCR catalyst 13. The ammonia surplus is itself related to the amount of urea solution injected into the exhaust line 3. The nitrous oxide sensor 17 is adapted to sending signals to the control unit 10 about the measured amount of nitrous oxide in the exhaust line 3. The measuring accuracy of a nitrous oxide sensor 17 is usually relatively good. This information provides the control unit 10 with good feedback about whether the urea solution is being injected in a correct amount or not. The control unit 10 receives also information from the temperature sensor 16 about the temperature of the exhaust gases. When the exhaust gases are at a low temperature, ammonia may be stored for a shorter time in the SCR catalyst 13. The control unit 10 also takes into account here any such storage of ammonia in the SCR catalyst 13. At step 26, it decides whether the nitrous oxide amount $N_2O$ is at a value within a desired range A. The nitrous oxide amount is not allowed here to be above an upper limit value $A_{max}$, as this would result in the release of too much nitrous oxide. Nor may the nitrous oxide amount be below a lower limit value $A_{min}$, since in that case the nitrogen oxides in the exhaust gases would not be sufficiently eliminated. The lower limit value $A_{min}$ may be a relatively small but acceptable amount of nitrous oxide in the exhaust gases. If the amount of nitrous oxide is at a value within the desired range A, the control unit 10 will find that the amount q of urea solution need not be adjusted. Thereafter the process starts again at step 21.

If at step 26 it receives information from the nitrous oxide sensor 17 that the amount of nitrous oxide $N_2O$ is above the upper limit value $A_{max}$, the control unit 10 will find that the amount q of urea solution supplied is too large. In that case the process reverts to step 24 and the control unit 10 will estimate a fresh reduced amount q of urea solution on the basis of the measured amount of nitrous oxide $N_2O$. The larger the amount of nitrous oxide measured by the nitrous oxide sensor 17, the more the amount q of the urea solution is reduced. The control unit 10 controls the pump 11 so that it conveys the fresh reduced amount q of urea solution from the tank 8, via the line 9, to the injection means 12 which injects the urea solution into the exhaust line 3. Thereafter, at step 25, the control unit 10 again receives information from the nitrous oxide sensor 17 about the amount of nitrous oxide in the exhaust line downstream of the ammonia catalyst 14. If the amount of nitrous oxide is then within the desired range A, the control unit 10 will find that the reduced amount q of urea solution supplied is acceptable. The process then starts again at step 21. In the opposite case, the process reverts to step 24 for continuing adjustment of the amount of urea solution injected into the exhaust line 3 until the nitrous oxide sensor 17 detects that the amount of nitrous oxide is at a value within the desired range A.

If at step 26 it receives instead information from the nitrous oxide sensor 17 that the amount of nitrous oxide $N_2O$ is below the lower value $A_{min}$, the control unit 10 will find that the amount q of urea solution supplied is too small, in which case the process reverts to step 24. The control unit 10 will thereupon estimate a fresh increased amount q of urea solution on the basis of the measured amount of nitrous oxide $N_2O$. The smaller the amount of nitrous oxide measured by the nitrous oxide sensor 17, the more the amount q of the urea solution is increased. The control unit 10 controls the pump 11 so that it conveys the increased amount q of urea solution from the tank 8, via the line 9, to the injection means 12 which injects the urea solution into the exhaust line 3. Thereafter, at step 25, the control unit 10 again receives information from the nitrous oxide sensor 17 about the amount of nitrous oxide in the exhaust line downstream of the ammonia catalyst 14. If the amount of nitrous oxide is within the desired range A, the control unit 10 will find that the reduced amount q of urea solution supplied is acceptable. The process then starts again at step 21. In the opposite case, the process reverts to step 24 for continuing adjustment of the amount of urea solution injected into the exhaust line 3 until the nitrous oxide sensor 17 detects that the amount of nitrous oxide is at a value within the desired range A.

The control unit 10 may at step 23 use stored information from previous adjustments when it estimates the amount of urea solution to be injected on the basis of information from the sensors 15, 18 about measured values of nitrogen oxides and exhaust flows. Any known measurement errors of the nitrogen oxide sensor 15 may therefore be corrected immediately so that correct urea dosage is achieved more quickly.

The invention is not restricted to the embodiment described above but may be varied freely within the scopes of the claims.

The invention claimed is:

1. An arrangement for controlling injection of a reducing agent in an exhaust line of a combustion engine, the arrangement comprising:
   an injection system configured for injecting the reducing agent into the exhaust line;
   a first catalyst in the exhaust line configured for reducing an amount of nitrogen oxides in exhaust gases in the exhaust line by supplying the reducing agent;

a second catalyst situated in the exhaust line downstream of the first catalyst in the direction of exhaust gas flow in the exhaust line, and the second catalyst is configured for converting ammonia in the exhaust gases to nitrogen gas and nitrous oxide;

a nitrous oxide sensor configured for monitoring the amount of nitrous oxide present in the exhaust line at a location downstream of the second catalyst in the exhaust line; and a control unit configured for controlling the injection system for adjusting the amount of reducing agent injected into the exhaust line if the sensor detects that the amount of nitrous oxide in the exhaust line is at a value which is not within a selected range.

2. An arrangement according to claim 1, wherein the control unit is configured for controlling the injection system for reducing the amount of reducing agent injected into the exhaust line when the amount of nitrous oxide in the exhaust line exceeds an upper limit value ($A_{max}$).

3. An arrangement according to claim 2, wherein the control unit is configured for controlling the injection system for reducing the amount of reducing agent injected into the exhaust line by a factor related to the amount of nitrous oxide in the exhaust line that exceeds the upper limit value ($A_{max}$).

4. An arrangement according to claim 1, wherein the control unit is configured for controlling the injection system for increasing the amount of reducing agent injected into the exhaust line when the amount of nitrous oxide in the exhaust line is below a lower limit value ($A_{min}$).

5. An arrangement according to claim 4, wherein the control unit is configured for controlling the injection system for increasing the amount of reducing agent injected into the exhaust line by a factor which is related to the amount of nitrous oxide in the exhaust line that is below the lower limit value ($A_{min}$).

6. An arrangement according to claim 1, further comprising a sensor which monitors a parameter related to the amount of nitrogen oxide in the exhaust line at a location upstream from the first catalyst in the exhaust line; and the control unit is configured for estimating the amount of reducing agent to be injected into the exhaust line on the basis of information from the sensor.

7. An arrangement according to claim 1, wherein the control unit is configured for estimating the amount of reducing agent to be injected into the exhaust line based on information received by the control unit about the exhaust flow in the exhaust line.

8. An arrangement according to claim 1, further comprising a temperature sensor which monitors the temperature of the exhaust gases in the exhaust line; and the control unit is configured for receiving information from the temperature sensor and to then decide whether the reducing agent is to be injected into the exhaust line.

9. An arrangement according to claim 1, further comprising a turbine located and configured for extracting energy from the exhaust gases; and the first catalyst and the second catalyst are situated in a portion of the exhaust line which is downstream of the turbine.

10. A method for controlling injection of a reducing agent in an exhaust line of a combustion engine, the engine comprising:

an injection system configured for injecting the reducing agent into the exhaust line;

a first catalyst in the exhaust line configured for reducing an amount of nitrogen oxides in exhaust gases in the exhaust line by supplying the reducing agent;

a second catalyst situated in the exhaust line downstream of the first catalyst in the direction of exhaust gas flow in the exhaust line and the second catalyst is configured for converting ammonia in the exhaust gases to nitrogen gas and nitrous oxide;

the method comprising:

monitoring the amount of nitrous oxide in the exhaust line at a location downstream of the second catalyst in the exhaust line, and controlling the injection system to adjust the amount of reducing agent injected into the exhaust line if the amount of nitrous oxide in the exhaust line is at a value which is not within a desired range.

11. A method according to claim 10, further comprising controlling the injection system to reduce the amount of the reducing agent injected into the exhaust line when the amount of nitrous oxide in the exhaust line exceeds an upper limit value ($A_{max}$).

12. A method according to claim 11, further comprising controlling the injection system to reduce the amount of reducing agent injected into the exhaust line by a factor related to the amount of nitrous oxide in the exhaust line that exceeds the upper limit value ($A_{max}$).

13. A method according to claim 10, further comprising controlling the injection system to increase the amount of reducing agent injected into the exhaust line when the amount of nitrous oxide in the exhaust line is below a lower limit value ($A_{min}$).

14. A method according to claim 13, wherein the step of controlling the injection system increases the amount of reducing agent injected into the exhaust line by a factor related to the amount of nitrous oxide in the exhaust line that is below a lower limit value ($A_{min}$).

15. A method according to claim 10, further comprising:

monitoring a parameter related to the amount of nitrogen oxide in the exhaust line at a location upstream from the first catalyst in the exhaust line; and estimating the amount of the reducing agent to be injected into the exhaust line on the basis of the parameter monitored.

16. A method according to claim 10, further comprising estimating the amount of reducing agent to be injected into the exhaust line based on information about exhaust flow in the exhaust line.

17. A method according to claim 10, further comprising:

monitoring temperature of the exhaust gases in the exhaust line; and deciding whether to inject the reducing agent into the exhaust line based on information about the temperature monitored.

18. A method according to claim 10, further comprising:

extracting energy from the exhaust gases in the exhaust line and wherein the first catalyst and the second catalyst are in a portion of the exhaust line situated downstream in the direction of exhaust gas flow of where the exhaust gases are extracted.

19. A method according to claim 18, further comprising the extracting of energy from the exhaust gases is with a turbine.

20. A method according to claim 15, wherein the parameter is monitored by obtaining information from a sensor for the parameter.

21. A method according to claim 17, wherein the temperature is monitored by a temperature sensor.

* * * * *